US008543524B1

(12) United States Patent
Fox et al.

(10) Patent No.: US 8,543,524 B1
(45) Date of Patent: Sep. 24, 2013

(54) METHOD FOR BENCHMARKING COMBINATORIAL PROBLEMS AND THEIR SOLUTIONS

(75) Inventors: Barry Ross Fox, Ballwin, MO (US); Steven James Jowers, Friendswood, TX (US)

(73) Assignee: The Boeing Company, Chicago, IL (US)

(*) Notice: Subject to any disclaimer, the term of this patent is extended or adjusted under 35 U.S.C. 154(b) by 266 days.

(21) Appl. No.: 13/110,663

(22) Filed: May 18, 2011

(51) Int. Cl.
*G06F 15/18* (2006.01)
*G06F 7/60* (2006.01)

(52) U.S. Cl.
USPC .................................. 706/13; 703/2

(58) Field of Classification Search
None
See application file for complete search history.

(56) References Cited

U.S. PATENT DOCUMENTS 5,890,134 A    3/1999   Fox

OTHER PUBLICATIONS

Performance Testing of Combinatorial Solvers With Isomorph Class Instances, F. Brglez and J. Osborne, ExpCS 2007, Jun. 13-14, 2007, ACM.*
P. Cheeseman et al., Where the Really Hard Problems Are, IJCAI'91 Proceedings of the 12th International Joint Conference on Artificial intelligence, vol. 1, pp. 331-337 (1991), Morgan Kaufmann Publishers Inc., San Francisco, CA.
J. Bresina et al., Search Space Characterization for a Telescope Scheduling Application, AAAI Technical Report FS-94-01, pp. 10-15 (1994), Association for the Advancement of Artificial Intelligence, Menlo Park, CA.
R. Kolisch and S Hartmann, Experimental Investigation of Heuristics for Resource-Constrained Project Scheduling: An Update, European Journal of Operational Research, vol. 174, pp. 23-37 (2006), Elsevier B.V., Amsterdam, Netherlands.

* cited by examiner

*Primary Examiner* — Alan Chen
(74) *Attorney, Agent, or Firm* — Robert E. Slenker

(57) ABSTRACT

Methods of benchmarking the problem solution space of a trial scenario for a combinatorial solver, as well as the characteristic performance of a combinatorial solver operating upon the trial scenario. Given a set of predetermined trial scenario data, the generalized method includes the steps of: (a) obtaining a random sequence; (b) reordering the predetermined trial scenario data into a randomized input form according to the random sequence; (c) inputting the randomized input form into a combinatorial solver; (d) solving the randomized input form with the combinatorial solver to produce a solution; (e) evaluating the solution to measure the value of a criterion of solution quality; and (f) recording the measured value of the criterion of solution quality in a data storage structure. The steps are repeated for a predetermined number of trials, whereupon the statistical distribution of the measured values is analyzed in order to determine at least one parameter of a statistical distribution function. The resulting parameters can be used to evaluate performance, to compare performance, and to estimate the computational effort to be invested in obtaining solutions exceeding a measurable criterion of quality.

20 Claims, 16 Drawing Sheets

METHOD FOR BENCHMARKING COMBINATORIAL PROBLEMS AND THEIR SOLUTIONS

FIELD

The present disclosure is directed to methods for benchmarking systems solving complex combinatorial problems and, most particularly, to methods for comparatively benchmarking computerized sequencing and scheduling systems.

BACKGROUND

Industry regularly employs information systems to solve complex combinatorial problems, e.g., computerized scheduling programs to manage the allocation of manufacturing equipment, manpower, and other resources amongst various projects. In computational complexity theory, combinatorial optimization problems are frequently classified as "NP-hard," and in real world applications it is impossible to calculate a truly optimal solution to an NP-hard combinatorial problem using practical quantities of computational resources for practical periods of time. Mathematicians and computer scientists have developed various approaches for finding good solutions (as opposed to singularly optimal solutions) for combinatorial problems such as Resource Constrained Project Scheduling ("RCPS") and the Traveling Salesman Problem ("TSP"), and such approaches may frequently be applied to more than one form of combinatorial problem. Software developers and vendors have naturally developed differing implementations of such known solution approaches for various types of industries, types of users, types of computer hardware, etc. Consequently, the marketplace for such information systems, or "combinatorial solvers," includes a range of competing options which have varying features, capabilities, and/or underlying solution approaches, and prospective purchasers face a need to evaluate at least a subset of those competing options prior to making a purchase decision.

Only in rare instances can any solution approach be mathematically proven to reliably find a singularly optimal solution to a combinatorial problem, so that by and large prospective purchasers seeking to compare the performance of combinatorial solvers must benchmark candidate solvers against one or more trial scenarios. However, benchmarking combinatorial solvers presents some unique challenges. Because a combinatorial solver cannot practically assess the entire population of solutions for a particular problem (a "problem solution space"), combinatorial solvers cannot properly be compared based upon whether the solver finds the optimal solution for a benchmark problem (if it is even known), nor based upon the raw computational effort required to find a good solution meeting some measurable criterion of quality, such as a cycle time for an RCPS scenario or a distance to be traveled for a TSP scenario. Instead, each combinatorial solver will tend to develop solutions that are influenced by a combination of the trial scenario and the solver's implementation of a solution approach (a "solver solution space"), and, unless the solution approach is entirely deterministic or exhaustive, a significant element of chance. Thus, in a benchmark trial, a strong solution approach with an inefficient implementation may only find average quality solutions, while a weak solution approach with a highly optimized implementation may find a superior quality solution. Yet, during longer operational uses, or when applied to more complex combinatorial scenarios, or if simply run in different testing circumstances (different trial scenario, different computing hardware, or merely a different number of permissible trials) the strong solution approach may prove to more reliably find better solutions. Although benchmark trials should seek to replicate a prospective purchaser's operating environment, time and resource constraints typically prevent all but the largest prospective purchasers from testing competing combinatorial solvers against representative real world scenarios on fully-scaled-up computer systems. Moreover, while academic research has gone to great lengths to develop benchmark methods which reduce the confounding effects of scenario-dependence, resource availability, and chance, no reliable method has been found to eliminate such effects. Consequently, current benchmarking methods tend to produce ambiguous, misleading, or unreliable results that, in general, are poor predictors of the performance of a combinatorial solver during otherwise routine applications of the solver in real world operations.

Finally, some existing benchmark methods can be influenced by 'off-line engineering,' in which the combinatorial solver's implementation of a solution approach is subtly influenced by, for instance, varying the order of the input conditions or fixing the value of a randomization seed in order to direct the combinatorial solver toward a previously determined solution for the benchmark problem. By applying a combinatorial solver to a known benchmark problem prior to a benchmark trial, varying the starting conditions, and then replicating the starting conditions under which the solver rapidly finds a particularly good solution to the problem, a solver can be subtly directed to 'find' the same good solution without altering the executable code of the solver. Because each combinatorial solver tends to have unique input and/or data storage formats, it may be possible to manipulate the ordering of the input conditions in order to influence the progress of the combinatorial solver through a problem solution space in ways which are not readily detectable as overt manipulation. Similarly, if a combinatorial solver uses a randomization seed (e.g., the content of a memory address) and pseudo-random number generator, it may be possible to manipulate the state of the computer to create a particular seed value and, in so doing influence the progress of the combinatorial solver. A combinatorial solver could thereby benefit from extensive pre-benchmark testing of the solver and solution space despite appearing to comply with the more limited constraints of the benchmark trial. Vendors may resist participating in benchmark trials because they suspect that other competitors will engage in such off-line engineering in order to influence the outcome of a benchmark comparison. Moreover, even if such concerns are addressed, vendors may challenge the results of competitive benchmarks, or even forbid the publication of benchmark results, out of fear of an unfavorable result attributable (realistically or not) to chance. Essentially any vendor can honestly say that they could have found a solution equal to or better than that found by another vendor if given a bit more time or a few more trials. However, using current benchmarking methods, there is no way to predict how much more time or how many more trials would likely be required.

Thus there is a need for a method of benchmarking a combinatorial problem, i.e., providing an approximate description of the population of potential solutions for a given combinatorial problem, as well for as an improved method of benchmarking the performance of a combinatorial solver given limited computational resources and limited amounts of time. Such methods may be used to describe the performance of a combinatorial solver relative to chance. Such methods may also be used in place of benchmark approaches which rank the output of combinatorial solvers for a single trial scenario, or even a suite of trial scenarios, to enhance the representativeness of the benchmark result with respect to different, non-benchmarked combinatorial problems of similar complexity. As will be discussed below, the results of the method may be employed to estimate the computational effort to be invested in order to obtain good solutions exceeding a measurable criterion of quality, allowing for more detailed evaluations of computational solvers which tend to develop solutions of similar quality.

SUMMARY

According to one aspect, a method of benchmarking the problem solution space of a trial scenario for a combinatorial solver. The trial scenario includes predetermined trial scenario data, and the method includes the steps of: (a) obtaining a random sequence; (b) reordering the predetermined trial scenario data into a randomized input form according to the random sequence; (c) inputting the randomized input form into an unbiased combinatorial solver; (d) solving the randomized input form with the unbiased combinatorial solver to produce a solution; (e) evaluating the solution to measure the value of a criterion of solution quality; and (f) recording the measured value of the criterion of solution quality in a data storage structure. The steps are repeated for a predetermined number of trials, whereupon the statistical distribution of the measured values in the data storage structure is analyzed in order to determine at least one parameter of a statistical distribution function. Example parameters include the mean (or first central moment) and variance (or second central moment) of a Gaussian distribution function.

According to another aspect, a method of benchmarking the characteristic performance of a combinatorial solver operating upon such predetermined trial scenario data. The method includes the steps of: (a) obtaining a random sequence; (b) reordering the predetermined trial scenario data into a randomized input form according to the random sequence; (c) inputting the randomized input form into the combinatorial solver; (d) solving the randomized input form with the combinatorial solver to produce a solution; (e) evaluating the solution to measure the value of a criterion of solution quality; and (f) recording the measured value of the criterion of solution quality in a data storage structure. The steps are repeated for a predetermined number of trials, whereupon the statistical distribution of the measured values in the data storage structure is analyzed in order to determine at least one parameter of a statistical distribution function. The parameter or parameters may be compared to the parameter or parameters determined from a benchmark of the problem solution space, or to the parameter or parameters determined from benchmarks of other combinatorial solvers, to compare the performance of one combinatorial solver to another and/or to chance.

DETAILED DESCRIPTION

Figure 1A:
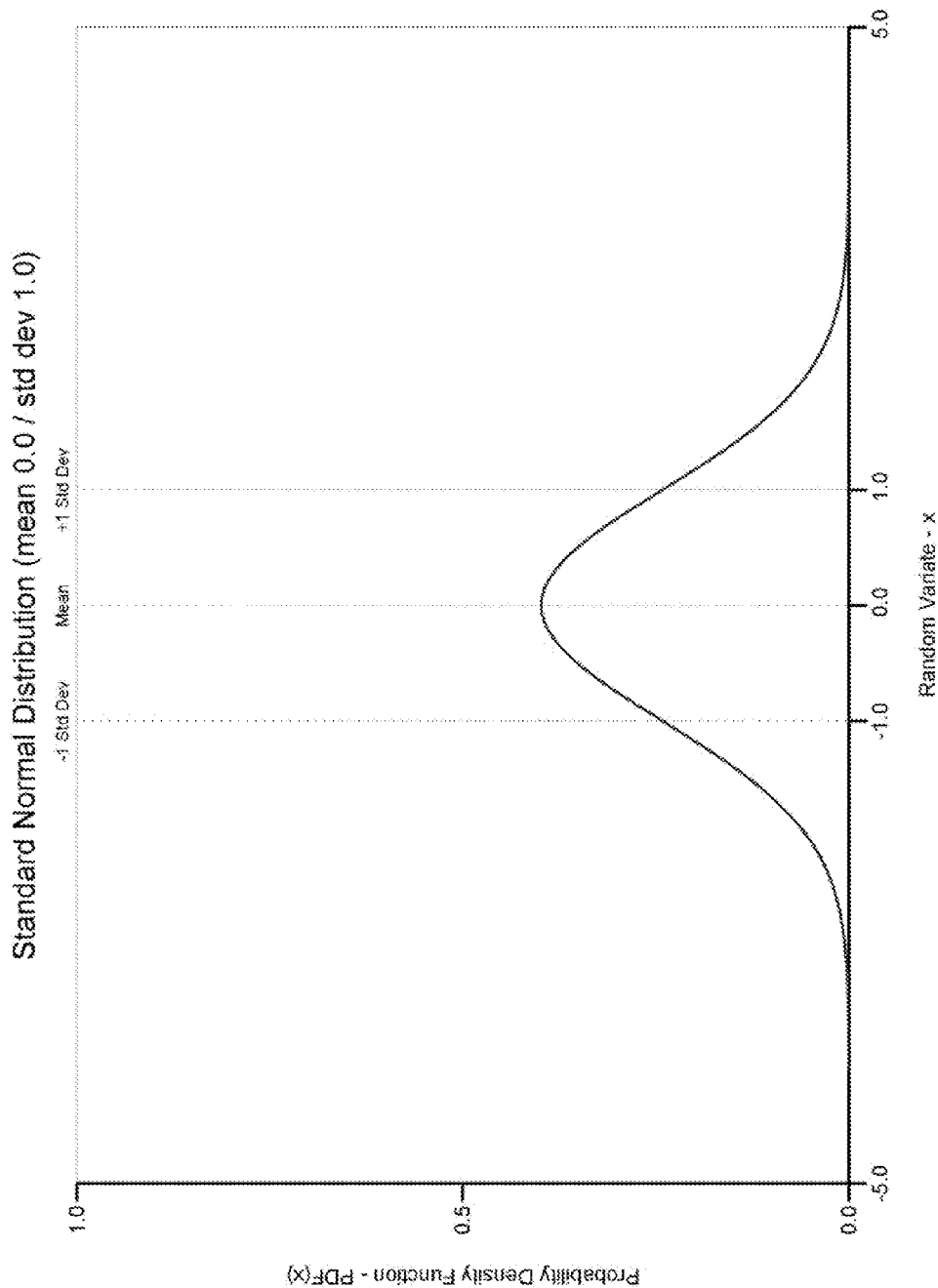
FIG. 1A is a graph of the probability density function of a standard normal distribution.

To illustrate the operational and financial impact of combinatorial optimization software, and of purchasing decisions involving combinatorial optimization software, consider the economics of the manufacturing enterprise. Modern industry typically combines capital intensive equipment, the labor of large groups of people, and various third party supplies to produce a finished product. Each business's competitive position is determined in part by how much work can be accomplished each day, making efficient use of the resources available to the business. However, people and equipment cannot be kept continuously busy. For example, during a manufacturing shift, a milling machine may spend the majority of its time operating and visibly performing value-added work, yet there will be other times when operations must be suspended for necessary reconfiguration or maintenance (like during the installation of a fixture), and still other times when the machine is simply idle, waiting for an operator to become available or for material to arrive. The ratio between value-added operating hours and total possible operating hours is a standard measure of resource utilization. If the milling machine is available 8 hours per shift, but performs only 6 hours of valued-added work per shift, then its resource utilization is 75%. If rescheduling permits 7 hours of valued-added work per shift with only 1 hour of reconfiguration and/or idle time, then its resource utilization is improved to 87.5%. Improvements to resource utilization have two benefits. First, they generally decrease the business cost of a finished product, allowing for improved product pricing and/or profit. Second, they generally decrease manufacturing cycle time, enabling more product to be produced per unit time with existing levels of equipment and labor.

In order to maximize the efficiency of their operations, businesses will typically schedule work in advance in order to keep their most valuable resources continuously engaged in value-added work. While scheduling cannot, by itself, maximize resource utilization, scheduling combined with well defined management practices and disciplined execution has a substantial effect on overall resource utilization. Although the present disclosure focuses on RCPS scenarios and TSP scenarios as general and detailed examples of applications of the disclosed method, respectively, those of skill in the art will recognize that the methods are not limited to those cases, and may be applied to any combinatorial problem and solution approach where a measurable criterion for solution quality (but not necessarily the sole criterion of solution quality) in the problem solution space can be approximated as a Gaussian or normal distribution. Moreover, the methods are not strictly limited to Gaussian or normal distributions, although these will likely be the most commonly encountered distributions. Without loss of generality, these methods may also be applied to problems having criteria which may be approximated by classical statistical distributions that may themselves be approximated by Gaussian or normal distributions, such as the Binomial or Poisson distributions. Most generally, the methods presented herein may be applied to problems where a measureable criterion for solution quality in the problem solution space can be approximated by any classical statistical distribution having defined moments and a defined cumulative density function. See NIST/SEMATECH e-Handbook of Statistical Methods, http://www.itl.nist.gov/div898/handbook/, rev. Jun. 32, 2010.

Figure 1B:
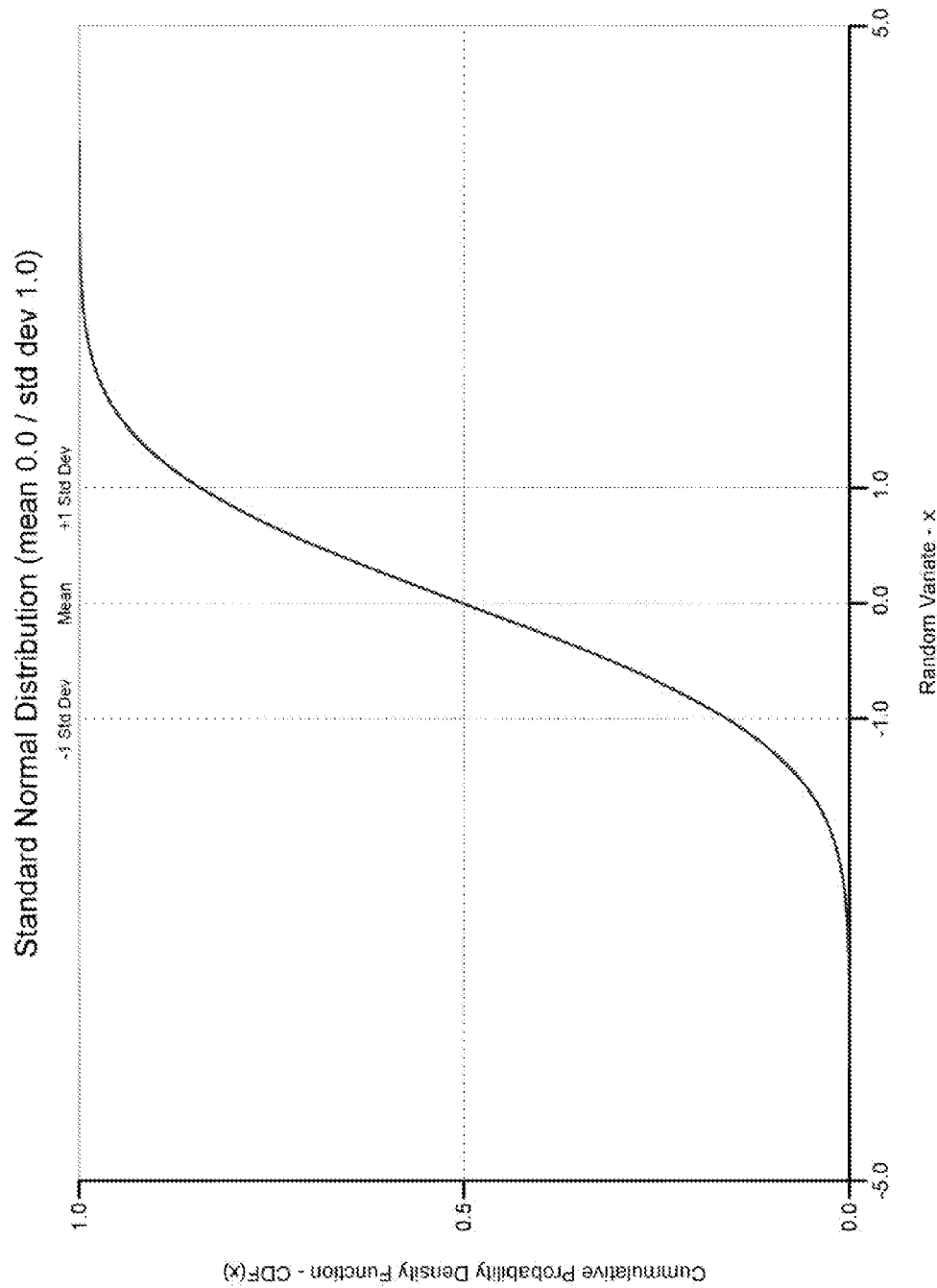
FIG. 1B is a graph of the cumulative probability density function of a standard normal distribution.
Figure 2:
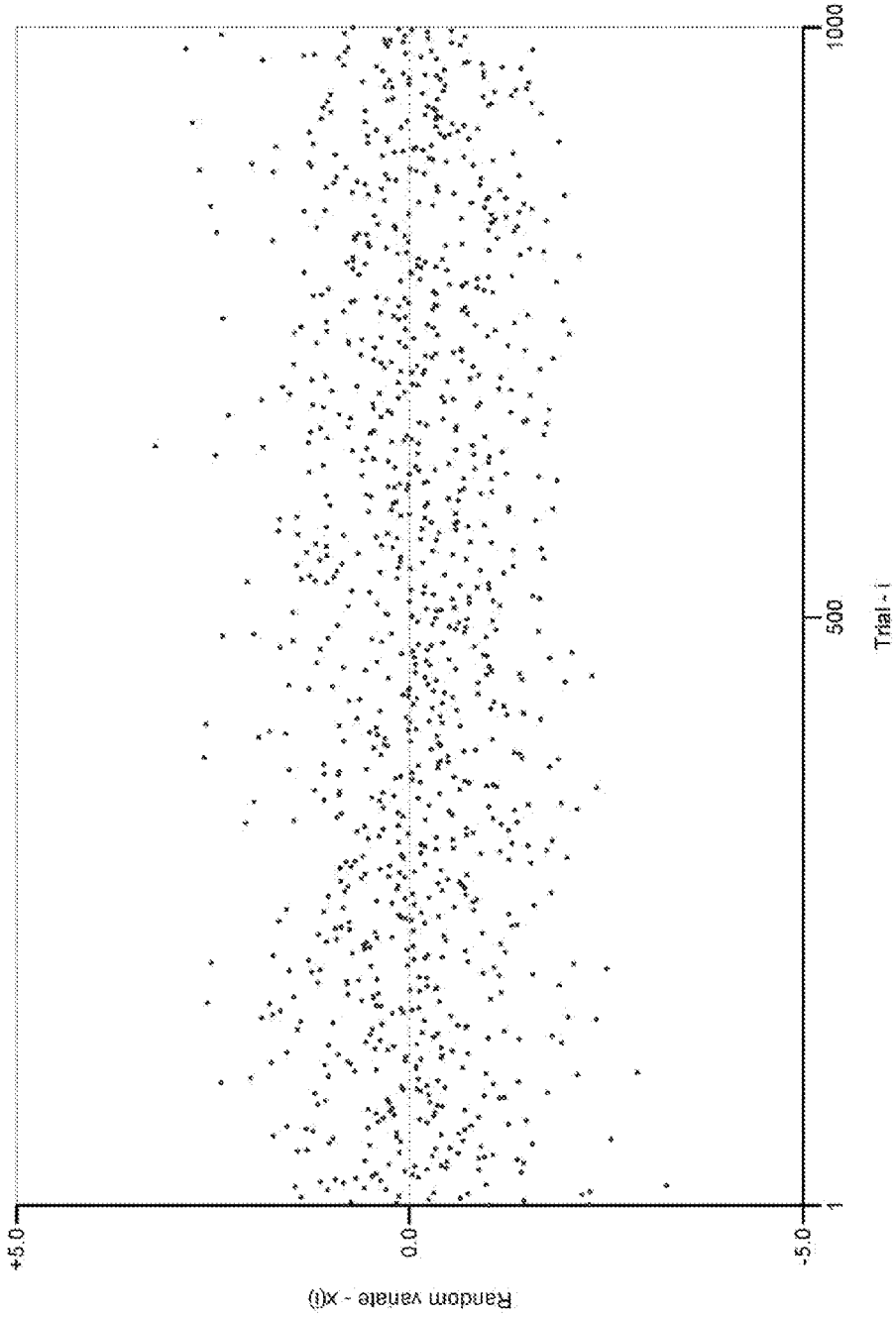
FIG. 2 is a plot of 1000 randomly selected samples taken from a population having a standard normal distribution, and scaled in terms of standard deviation from the mean, versus sample number.
Figure 3A:
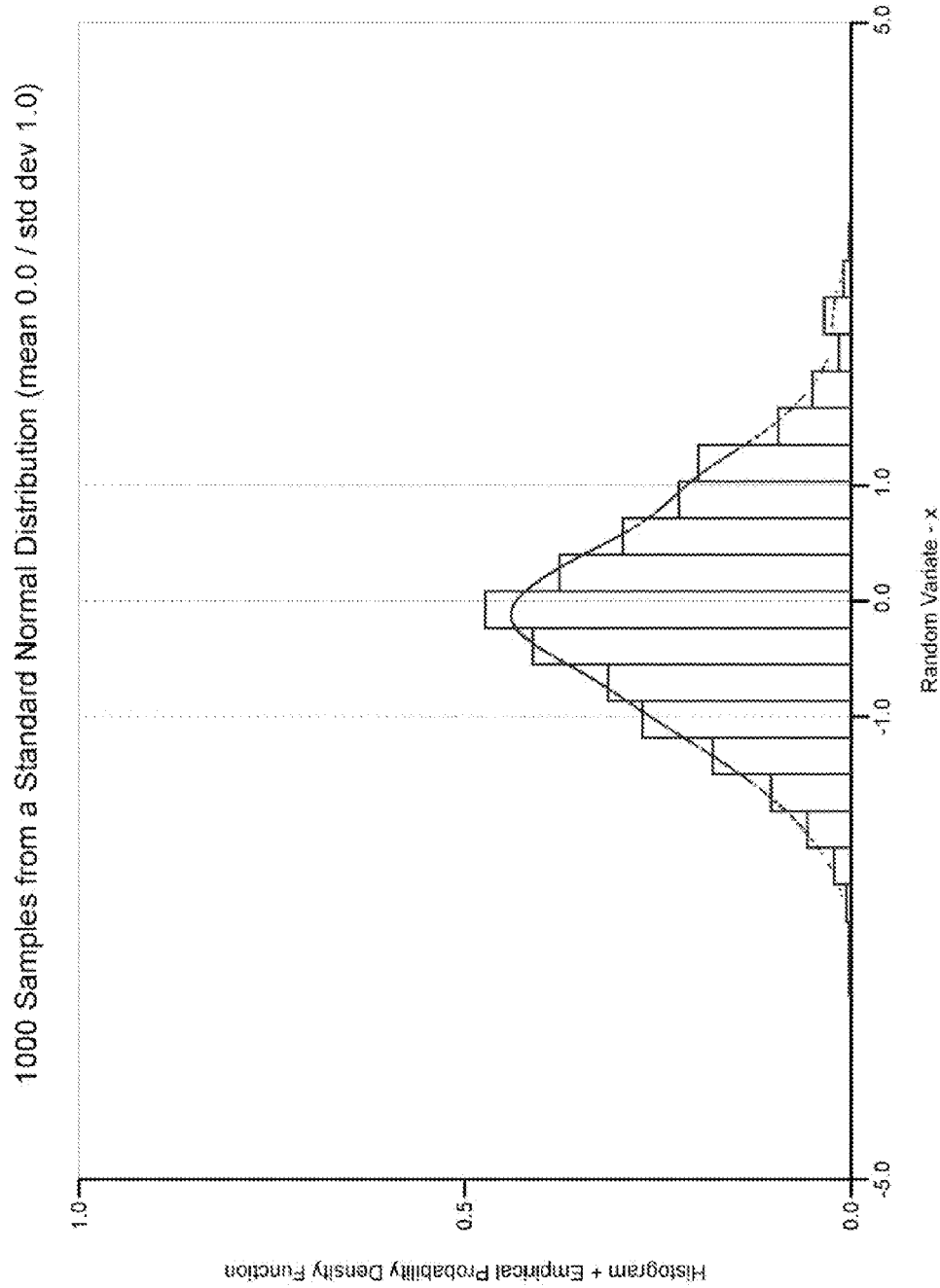
FIG. 3A is a graph of the empirical probability density function of the sampled population shown in FIG. 2 versus standard deviation from the mean. A histogram of the number of samples falling within evenly spaced quantile bins is superimposed for illustrative purposes.
Figure 3B:
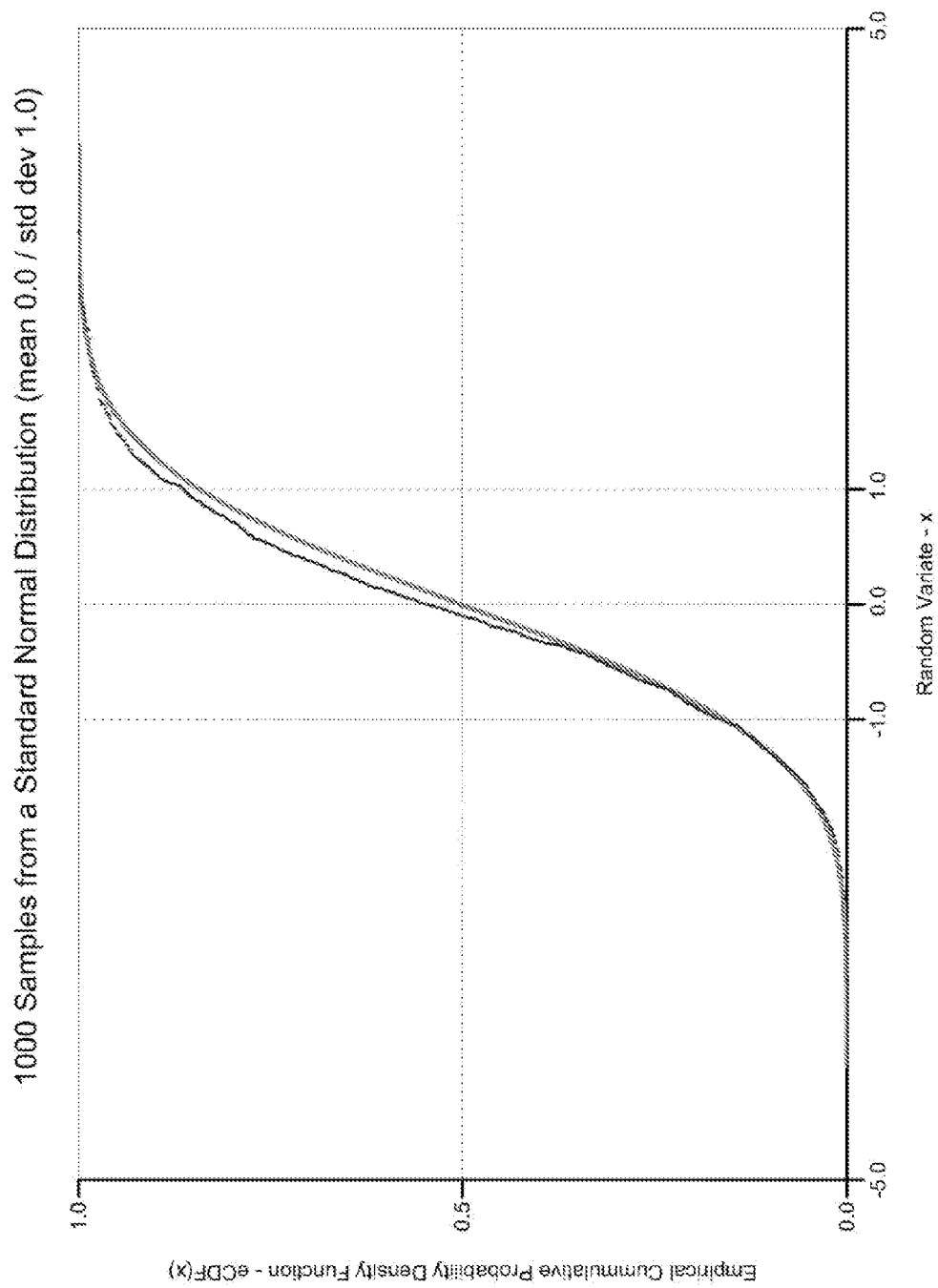
FIG. 3B is a graph of the empirical cumulative probability density function of the sampled population shown in FIG. 2 versus standard deviation from the mean. The graph of FIG. 1B has been superimposed for illustrative purposes.

As shown in FIG. 1A, a Gaussian or normal distribution is the well known, symmetric, two-tailed distribution arising out of the Central Limit Theorem. As shown in FIG. 1B, the distribution may also be expressed as a cumulative probability density function, providing the probability of a randomly collected sample having a value that is less than a selected threshold value. For any measurement that is the sum or average of a large number of independent random variates, the measurement will tend to take the form of a Gaussian distribution. For example, if a measurement is based upon 1000 samples of the cycle time of randomly created project schedules, the measurement will tend to cluster about a mean value $\mu$, with a variance $\sigma^2$ and standard deviation $\sigma$. A plot of the sampled values, scaled in terms of standard deviation from the mean and plotted against their order in the sampling sequence, might have the appearance of the plot shown in FIG. 2. An empirical probability density function derived from the samples, shown in FIG. 3A, approximates the standard normal probability density function shown in FIG. 1A, although a histogram dividing the sample population into a quantity of bins of approximately equal values (in the illustrated case, bins of approximately equal standard deviation from the mean) could also be constructed in order to assess whether the distribution is approximately Gaussian. Alternately, an empirical cumulative probability density function derived from the samples, shown in FIG. 3B, may be visually and/or analytically correlated to a Gaussian cumulative probability density function, like the one shown in FIG. 1B and superimposed within FIG. 3B, in order assess whether the distribution is approximately Gaussian.

Figure 4:
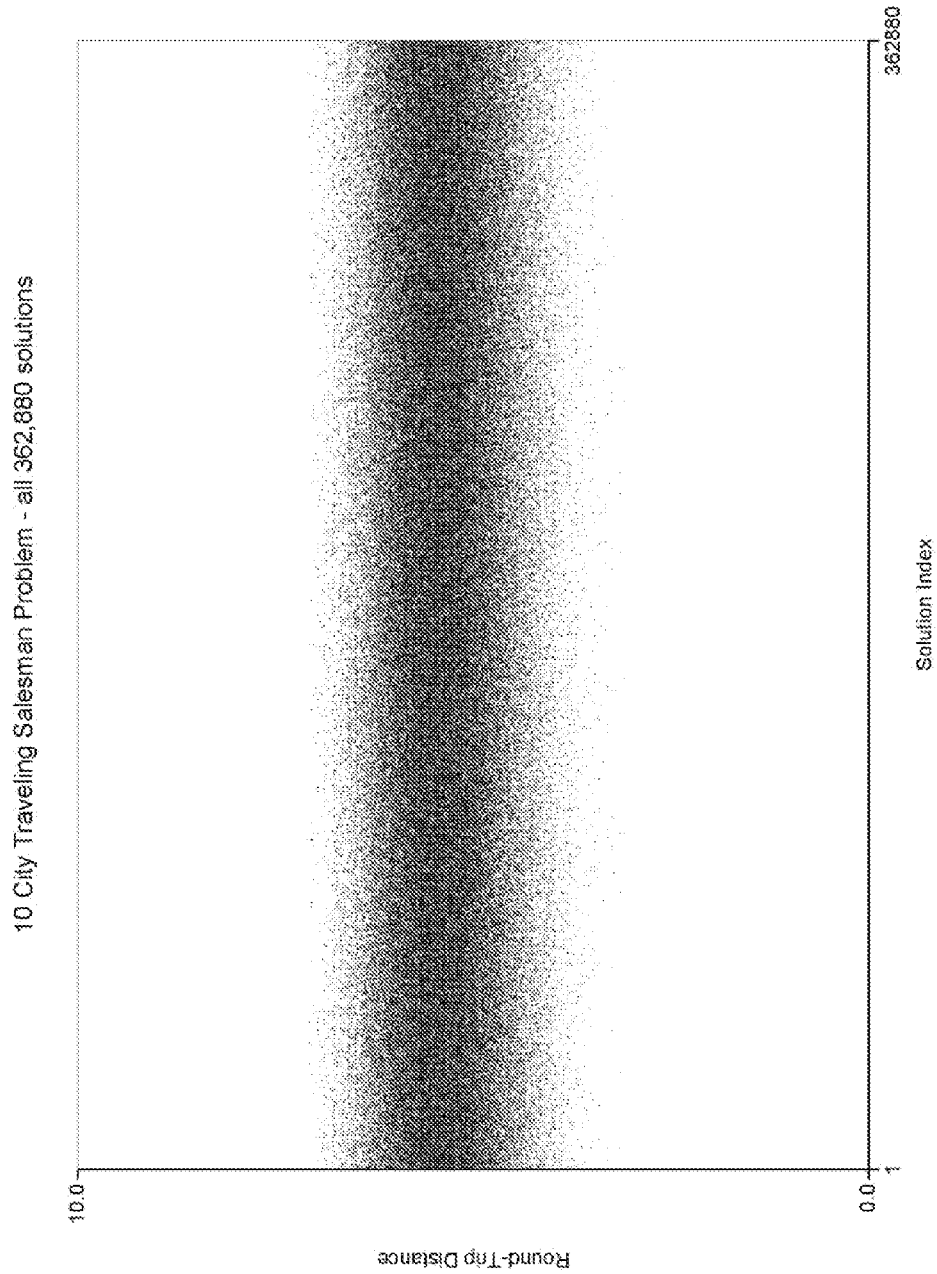
FIG. 4 is a plot of the problem solution space of a 10 city Traveling Salesman Problem in terms of round trip distance.
Figure 5A:
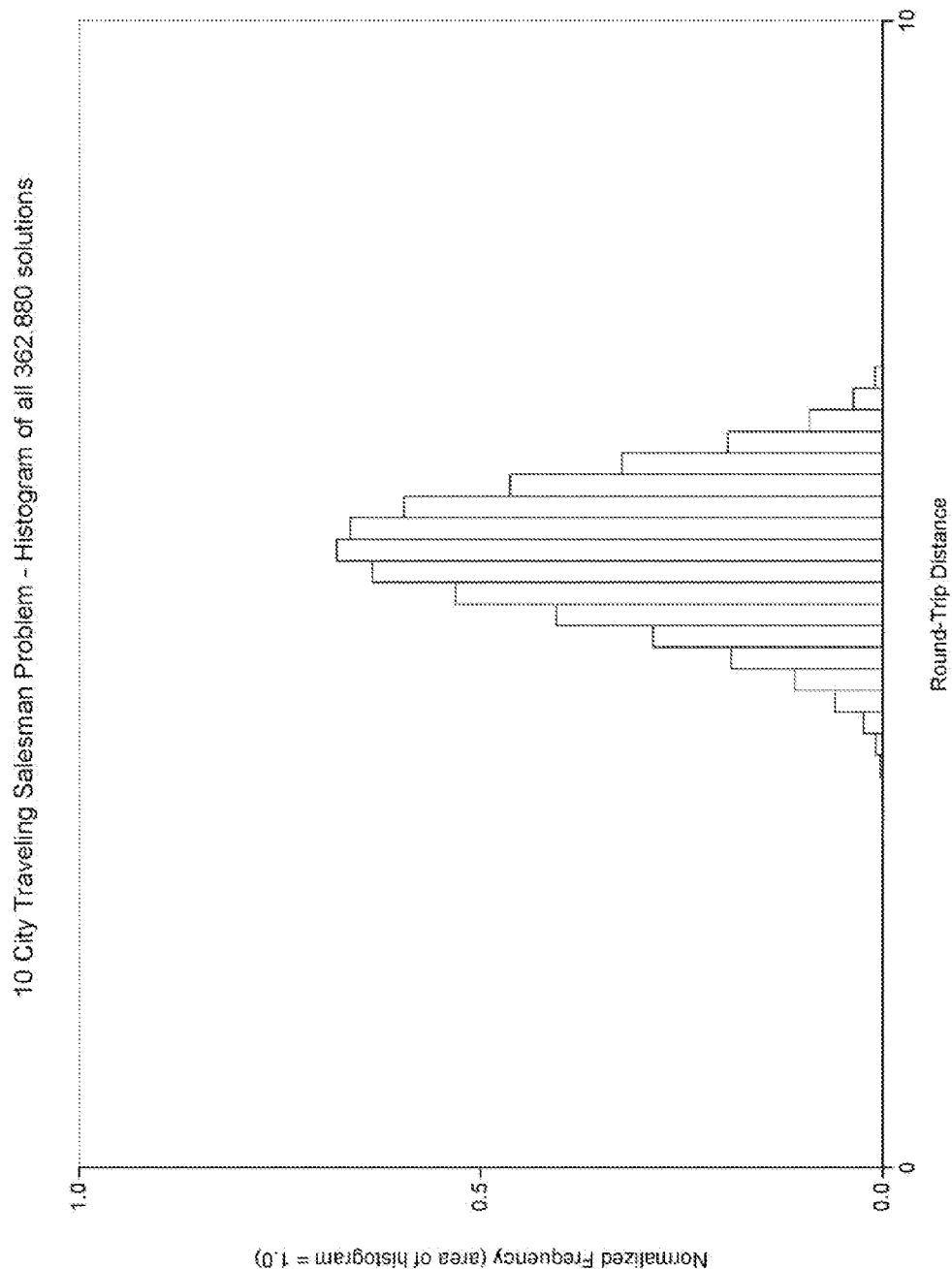
FIG. 5A is a histogram of the solutions plotted in FIG. 4 in terms of round trip distance.
Figure 5B:
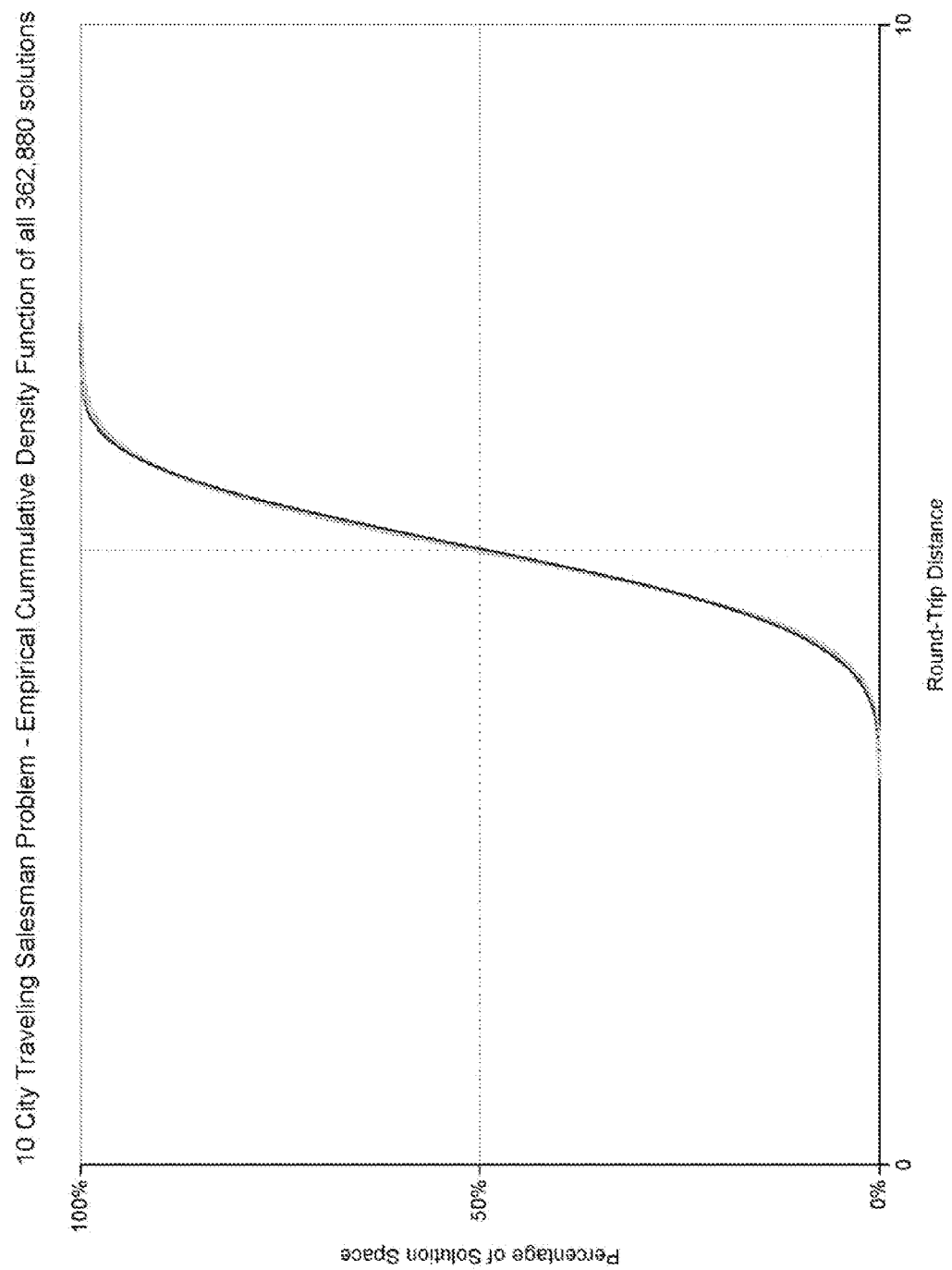
FIG. 5B is a graph of the empirical cumulative probability density function of the solutions plotted in FIG. 4 in terms of round trip distance. A cumulative probability density function for a Gaussian distribution has been superimposed for illustrative purposes.
Figure 6:
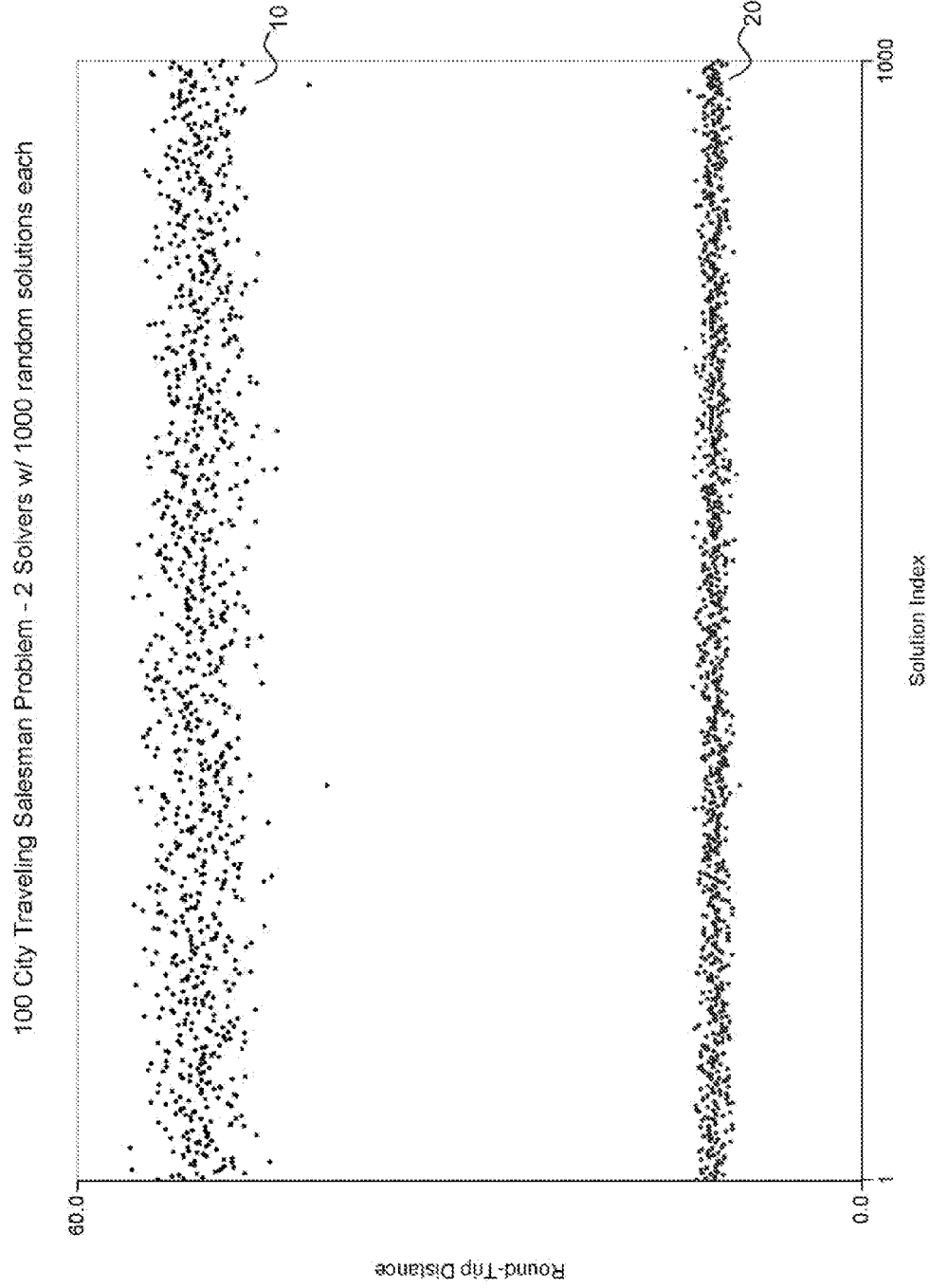
FIG. 6 is a plot of 1000 randomly selected samples from the problem solution space for a 100 city Traveling Salesman Problem in terms of round trip distance (indicated with reference numeral 10) and 1000 randomly selected samples from the solver solution space for the same problem found by a combinatorial solver commonly known as "2-opt" (indicated with reference numeral 20).
Figure 7A:
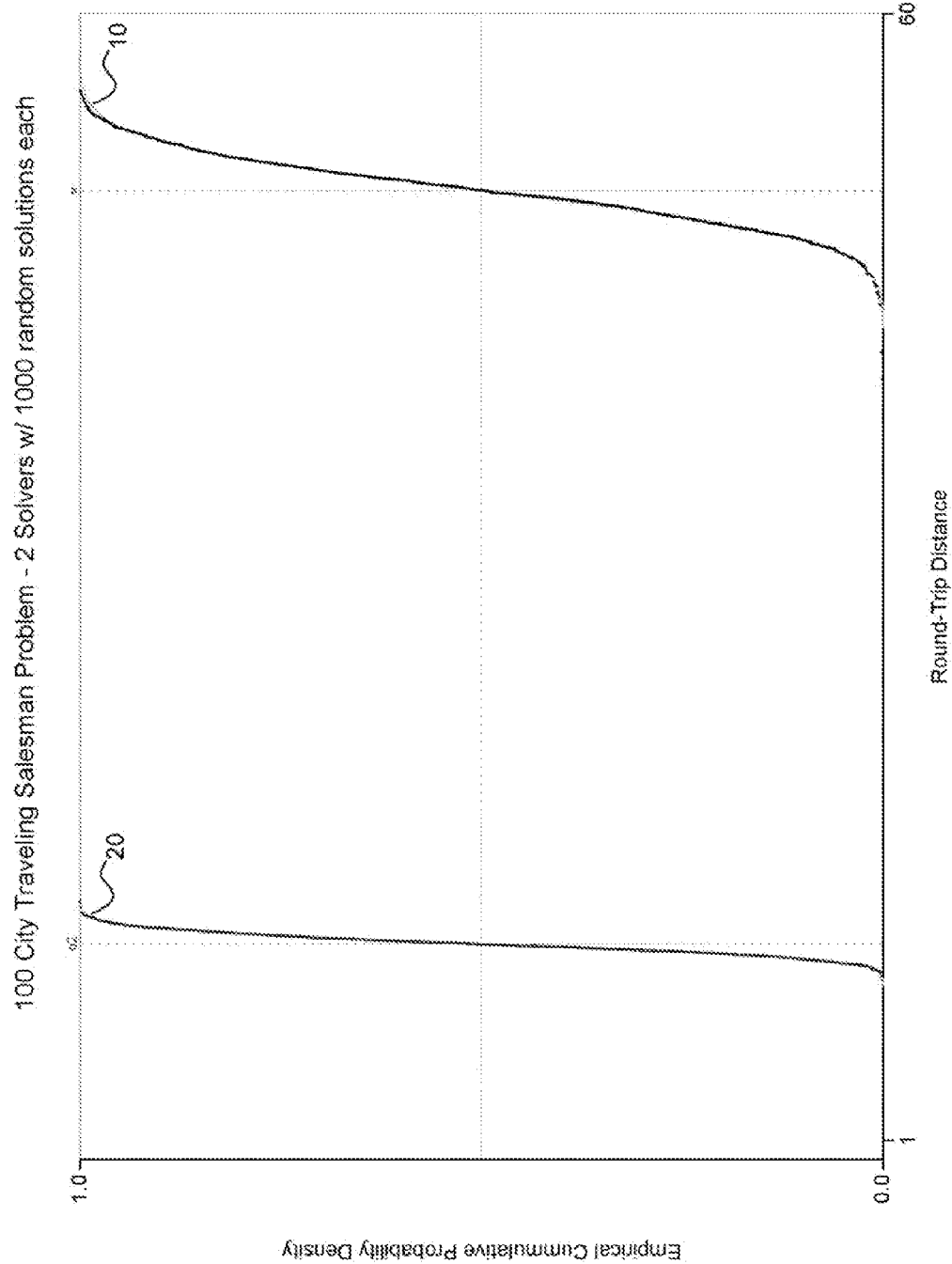
FIG. 7A is a graph of the empirical cumulative probability density function of the respective samples shown in FIG. 6 versus the measured round trip distance. The location of the mean within the empirical cumulative probability density function for the problem solution space (indicated with reference numeral 10) is illustrated as line "u". The location of the mean within the empirical cumulative probability density function for the opt-2 solver solution space (indicated with reference numeral 20) is illustrated as line "o2".
Figure 7B:
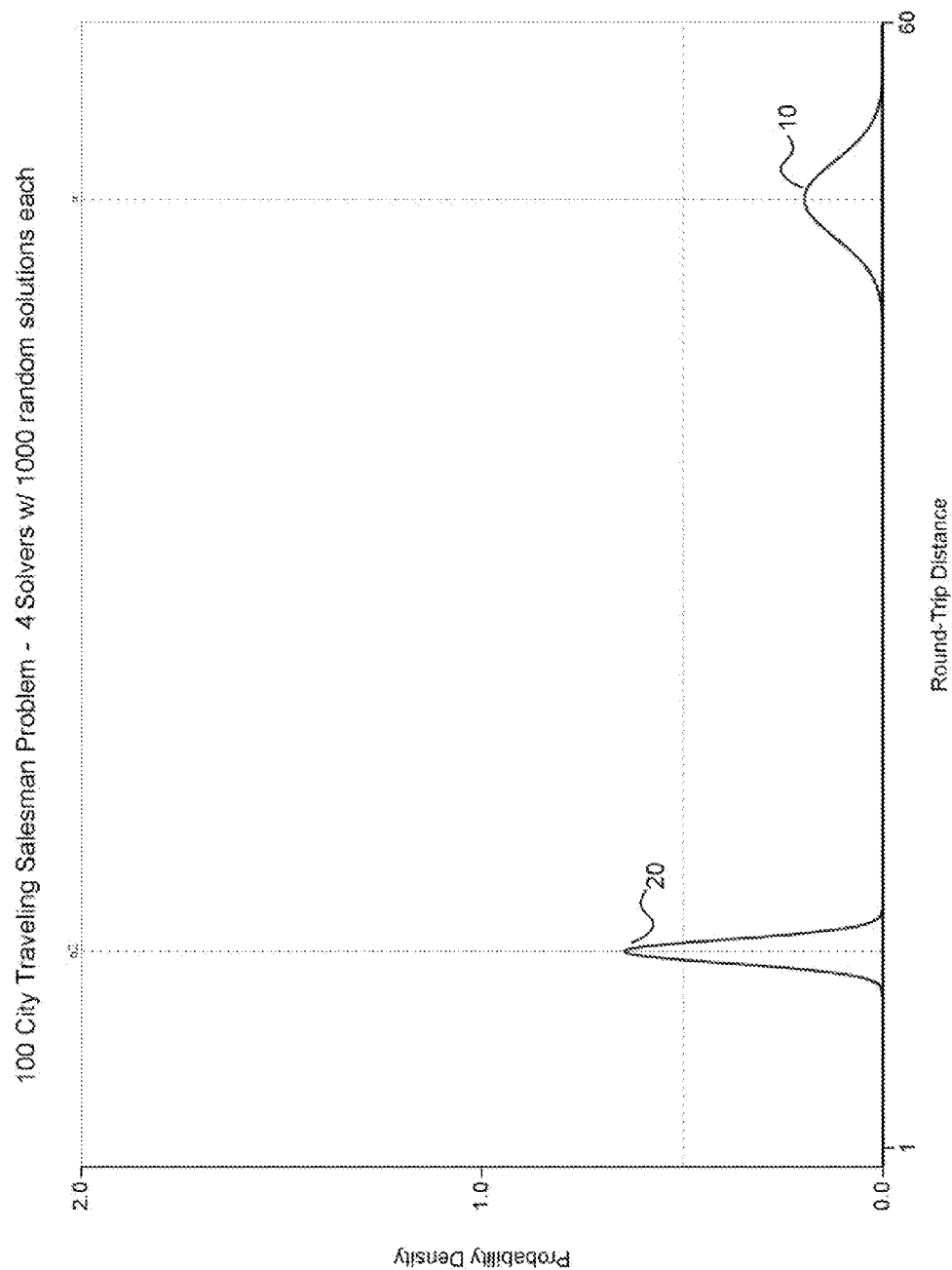
FIG. 7B is a graph of the empirical probability density function of the respective samples shown in FIGS. 6 and 7A.

The applicants have found that RCPS scenarios of sufficient complexity, e.g., 25 or more activities involving 3 or more resources, and TSP scenarios of sufficient complexity, e.g., 10 or more locations, have problem solution spaces in which typical criteria of quality, i.e., measurements of cycle time or round trip distance, respectively, are approximately Gaussian distributed. For example, FIG. 4 plots the round trip distance of all 362,880 potential solutions to a 10 city TSP scenario. The empirical probability density function, approximated by the histogram shown in FIG. 5A, displays a Gaussian-like, generally symmetric, two-tailed shape. The empirical cumulative probability density function, shown in FIG. 5B, may be visually correlated to a Gaussian cumulative probability density function, such as the function superimposed within the figure, or analytically tested by mathematical analyses such as the Anderson-Darling Test. However, it is not necessary to calculate all potential solutions to a complex combinatorial problem in order to determine whether a measurement in the problem solution space is normally distributed. Rather, as demonstrated in the example of the prior paragraph, it is possible to evaluate solutions randomly distributed within the problem solution space, obtained via an unbiased combinatorial solver, and to subsequently assume that the unbiased solver solution space and the problem solution space are statistically equivalent. Such a sample 10 is shown in FIG. 6, with the samples plotted versus Gaussian distribution functions in FIGS. 7A and 7B about mean "u." In using the term "unbiased solver," the applicants mean any algorithm that will construct a solution without imposing a fixed process that constrains the generated solutions and without applying any heuristic or other technique intended to construct a good solution. Those practiced in the art of optimization algorithms will recognize that the following are examples of unbiased solvers:

(1) in a TSP-type problem, an algorithm that 'visits' the problem cities in exactly the order of the input data; and
(2) in an RCPS-type problem, an algorithm that attempts to schedule the problem activities in exactly the order of the input data, without violating precedence constraints (repeatedly processing the data in the same order until all activities have been scheduled).

In both cases, a population of solutions can be produced by randomly varying the order of the input data for the algorithm, and the problem solution space can be effectively sampled by repeating the process for the number of trials necessary to provide the desired statistical power. A similar sampling is used to evaluate solutions randomly distributed within a solver solution space, obtained via a candidate combinatorial solver. Such a sample 20 is shown in FIG. 6, with the samples plotted versus Gaussian distribution functions in FIGS. 7A and 7B about mean "o2." For sake of clarity, a computer program including a combinatorial solver could accept an externally randomized input form or, alternately, internally vary the order of input data acted upon by the combinatorial solver, such that the randomized input form is not literally input into the computer program itself, but rather generated by the computer program and used by the internal algorithm. Similarly, other steps described in the aspects set forth below may be performed by multiple program-agents, acting in concert, or by a single computer program executing each step of that aspect. Those skilled in the art will recognize that some existing programs may require modification in order to expose solutions constituting 'intermediate' results before proceeding with further iterations of a randomized search, or to otherwise report criterion values, parameter values, and the like as further described below.

Figure 8:
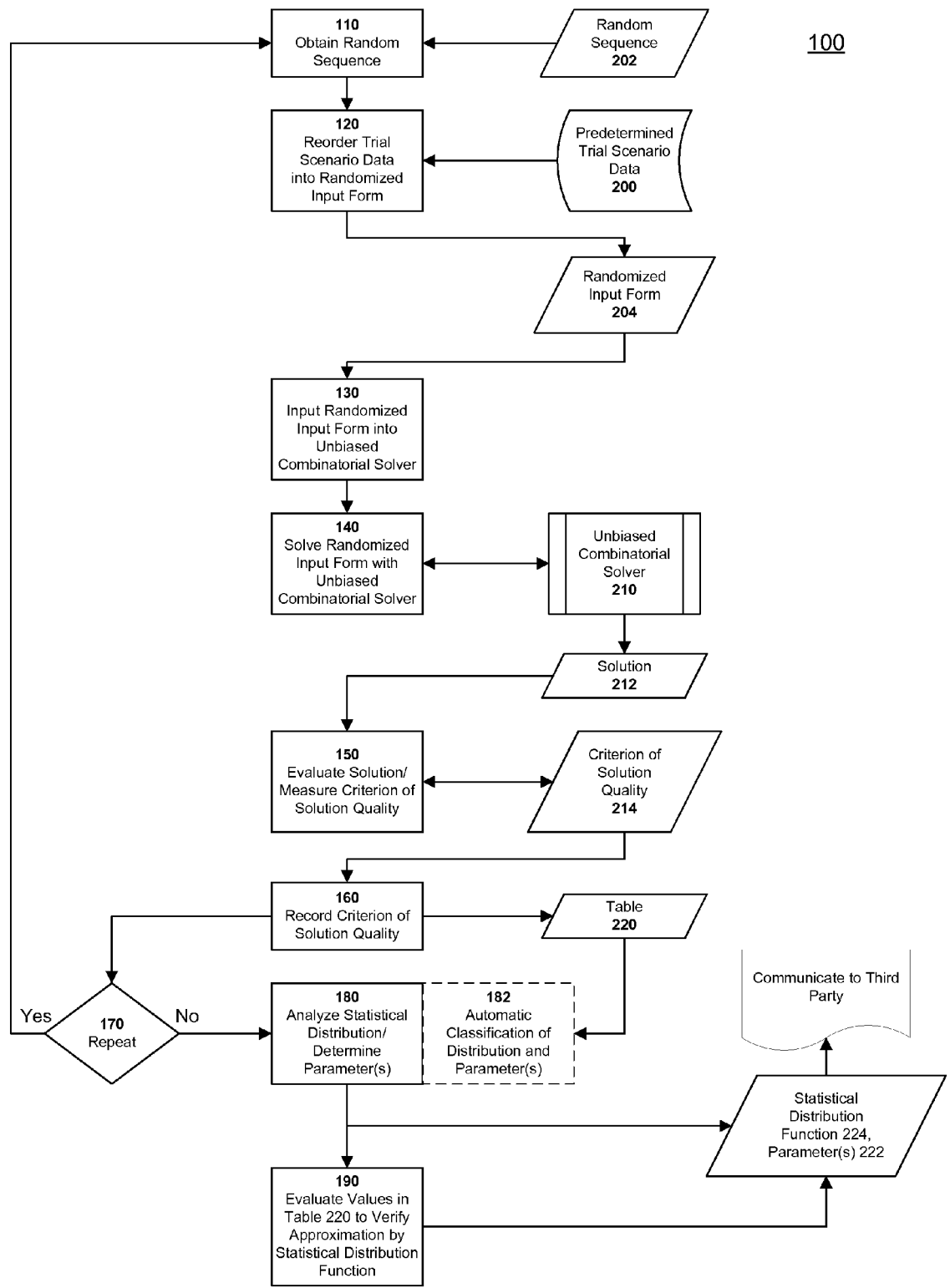
FIG. 8 is a flow chart illustrating the steps of one aspect of the disclosed method.

In one aspect of the disclosed method 100, shown in FIG. 8, predetermined trial scenario data 200 is repeatedly presented to an unbiased combinatorial solver 210 in a randomized form in order to develop the parameters of a statistical distribution, such as the mean and standard deviation of a Gaussian distribution, which 'benchmarks' or approximately describes the problem solution space. A first step 110 requires obtaining a random sequence 202. Means for obtaining a random sequence, such as the use of a pseudo-random number generator, will be well known to those of skill in the art. In a second step 120, the predetermined trial scenario data 200 is reordered into a randomized input form 204 according to the random sequence 202. Means for reordering the predetermined trial scenario data 200, such as a bubble sort routine, will also be well known to those of skill in the art. In a third step 130, the randomized input form 204 is input into an unbiased combinatorial solver 210. In a fourth step 140, the unbiased combinatorial solver 210 solves the randomized input form 204 to produce a solution 212. In a fifth step 150, the solution 212 is evaluated to measure the value of a criterion of solution quality 214. Various criterion of solution quality, such as cycle time for a RCPS scenario or round trip distance for a TSP scenario, will be familiar to those of skill in the art. In a sixth step 160, the measured value of the criterion of solution quality 214 is recorded in a data storage structure 220 such as a table or array. In a seventh step 170, the first through sixth steps are repeated for a predetermined number of trials. In an eighth step 180, the statistical distribution of the measured values 214 in the data storage structure 220 is analyzed and the parameters 222 for a statistical distribution function 224 are determined. For Gaussian distributions, such parameters include but are not limited to the mean $\mu$, variance $\sigma^2$, and standard deviation $\sigma$ of the distribution. Other distribution functions and distribution function parameters are available in standard reference texts in the field of statistics.

As a recommended additional step 190, the population of measured values 214 in the data storage structure 220 may be evaluated to verify that it may be reasonably approximated by a particular statistical distribution function. For example, the population may be plotted as a histogram for comparison with a distribution function which may optionally be superimposed upon the plot. For further example, the population may be subjected to a mathematical analysis, such as the Anderson-Darling test, to check whether there is evidence of a significant deviation from an assumed probability distribution function. In an alternative approach, the analysis of the eighth step 180 may include an automatic classification step 182 which determines the statistical distribution function 224 to be used, and thus the nature of the parameters 222 to be determined.

In a final step of this first aspect of the disclosed method, the parameters 222 for the statistical distribution function 224 and, either explicitly or implicitly, the statistical distribution function 224 itself may be communicated to a third party, such as vendor or prospective purchaser. The first aspect of the disclosed method 100 may be performed by entities such as benchmarking organizations, a prospective purchaser, or even a vendor seeking to market its solution. The communicated statistical parameters may then allow third parties to determine, without need to purchase or operate any particular combinatorial solver, the likelihood that a reported solution to a trial scenario, most typically the best solution developed by an externally or internally iterated combinatorial solver, would have been developed as a result of mere chance.

Figure 9:
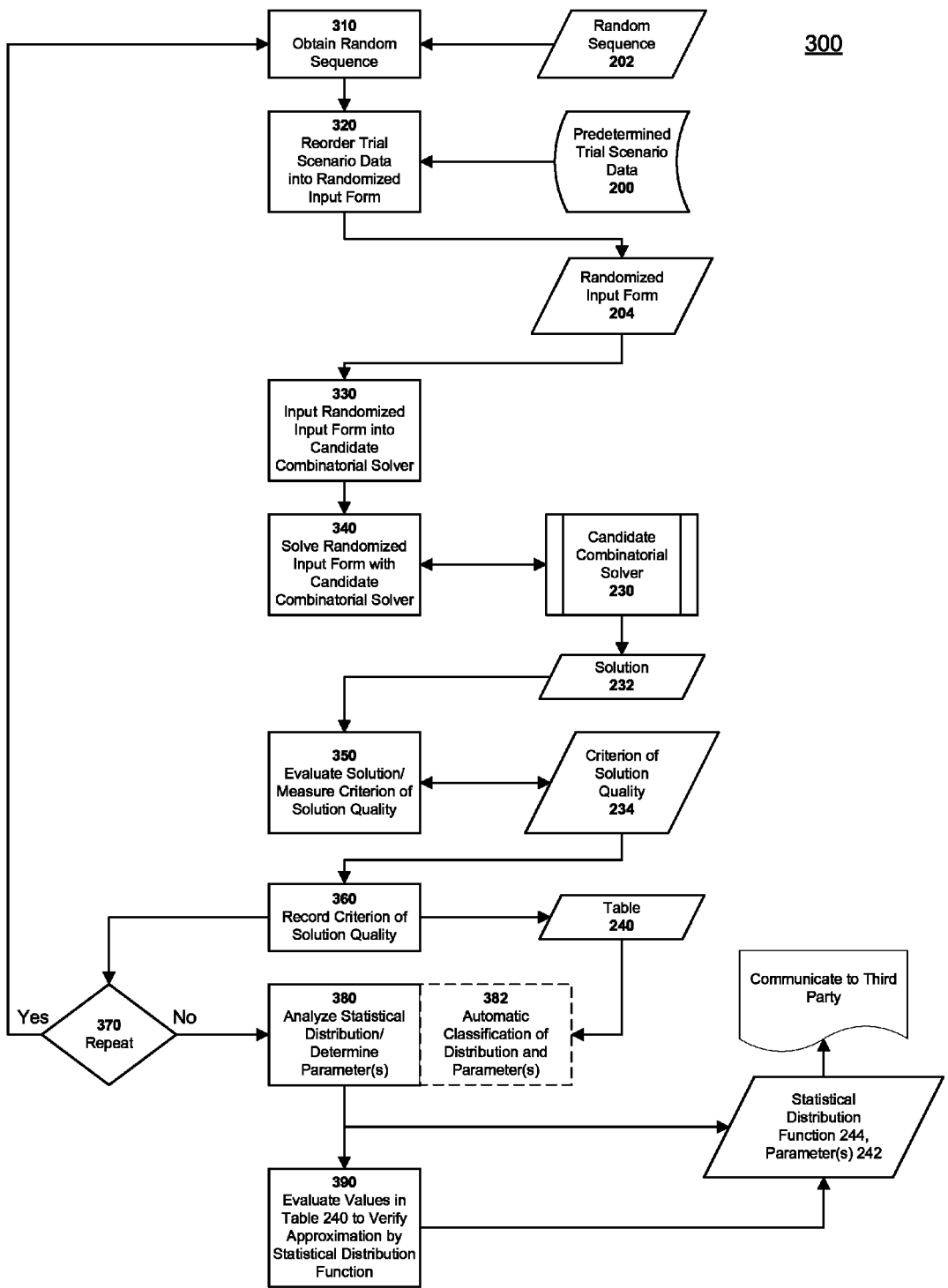
FIG. 9 is a flow chart illustrating the steps of another aspect of the disclosed method.

In another aspect of the disclosed method 300, shown in FIG. 9, predetermined trial scenario data 200 is repeatedly presented to a candidate combinatorial solver 230 in randomized form in order to develop the parameters of a statistical distribution, such as the mean and standard deviation of a Gaussian distribution, which 'benchmarks' or approximately describes the solver solution space (as opposed to the problem solution space). The steps mirror those employed in the first aspect, so that a first step 310 requires obtaining a random sequence 202. Then in a second step 320, the predetermined trial scenario data 200 is reordered into a randomized input form 204 according to the random sequence 202. In a third step 330, the randomized input form 204 is input into the candidate combinatorial solver 230. In a fourth step 340, the candidate solver 230 solves the randomized input form 204 to produce a solution 232. In a fifth step 350, the solution 232 is evaluated to measure the value of the criterion of solution quality 234. In a sixth step 360, the measured value of the criterion of solution quality 234 is recorded in a data storage structure 240. In a seventh step 370, the first through sixth steps are repeated for a predetermined number of trials. In an eighth step 380, the statistical distribution of the measured values 234 in the data storage structure 240 is analyzed and the parameters 242 for a statistical distribution function 244 are determined. Persons skilled in statistics will note that the statistical distribution function 244 and the statistical distribution function 224, or the statistical distribution function 244 of another candidate combinatorial solver 230 operating upon the same predetermined trial scenario data 200, need not be the same. If the solution data can reasonably be approximated by a Gaussian distribution, Binomial distribution, Poisson distribution, or others having defined moments and a defined cumulative density function, then the defined moments may be derived from the reported parameters and used, in conjunction with a reported statistical distribution function, as a basis for comparison. More sophisticated analyses of the reported parameters, such as comparisons of synthetic cumulative distribution functions plotted with respect to selected criterion of solution quality (similar to the standard normal distribution plotted in FIG. 1B) may also be used to compare combinatorial solver solution spaces best described by different statistical distribution functions.

In a final step of this second aspect of the disclosed method, the parameters 242 for the statistical distribution function 244 and, either explicitly or implicitly, the statistical distribution function 244 itself may be communicated to a third party. The second aspect of the disclosed method 300 may be performed by entities such as benchmarking organizations or a vendor seeking to market its solution. The communicated statistical parameters allow prospective purchasers to compare, without need to purchase or operate any particular combinatorial solver, the combinatorial solver solution space with the problem solution space, and so determine the typical improvement that the combinatorial solver provides over solutions arrived at by chance. Even more advantageously, the communicated statistical parameters allow prospective purchasers to evaluate the likelihood that a combinatorial solver will find a solution that is superior to a predetermined threshold of the criterion of solution quality, and thus estimate the number of times that a combinatorial solver will likely need to be run in order to find a solution exceeding that threshold.

Example 1

The applicants have performed a benchmark analysis of a manufacturing scheduling problem contained within a publicly available data set, "RCPS data_set version 1 [dated] Mar. 13, 1995," available at http://cs.jhu.edu/~jason/325/hw2/benchmrx/default.html. Many possible schedules are possible for the selected benchmark schedule—575! or approximately $10^{1013}$ different schedules Using cycle time, in minutes, as the criterion of solution quality, the problem solution space was sampled and analyzed to according the first aspect of the method to determine that a collection of randomly generated schedules have a normal distribution with a mean cycle time of 50012 minutes and standard deviation of 1167 minutes (or variance of 1361889 minutes$^2$). There are two conclusions that can be reached from this information. First, it is easy to produce a schedule with a cycle time less than or equal to the mean (50% probability). Second, assuming that the combinatorial solver does not take too long to produce an individual schedule, applying the combinatorial solver to a randomized form of the benchmark scenario could reasonably be expected to yield a schedule with a cycle time that is about 3 standard deviations (or more) below the mean, with a cycle-time of about 46510 minutes (a decrease of about 7%). Such a schedule would likely be found by applying the combinatorial solver to a randomized form of the benchmark scenario over 1000 trials, i.e., in 1 instance in 1000 trials, but of course could in fact require a greater or lesser number of trials. For example, the applicants were able to produce a solution having a cycle time of 46908 minutes (a decrease of 6.2% from the mean) in one instance of running 1000 trials using an unbiased solver. Because the statistical parameters have been determined using an unbiased combinatorial solver, the parameter values can be assumed to approximately describe not only the unbiased solver solution space but also the problem solution space, and any optimized combinatorial solver, like those marketed by a vendor, would be expected to typically produce solutions which equal or exceed the solution quality of these solutions, which represent those that could be developed as a mere matter of chance.

The applicants have subsequently benchmarked a straightforward implementation of the schedule optimization method discussed in U.S. Pat. No. 5,890,134, the entirety of which is hereby incorporated by reference. The solver solution space for the manufacturing scheduling problem was sampled and analyzed according to the second aspect of the method to determine that a collection of randomly generated good schedules has a normal distribution with a mean cycle time of 39237 minutes and a standard deviation of 567 minutes (variance of 321883 minutes$^2$). Comparing the mean of the solver solution space with the mean and standard deviation of the problem solution space, it is easy to see that the solutions developed by the optimizing combinatorial solver are typically significantly better than those that would be expected to be developed by mere chance, and that it is easy to develop a schedule with a cycle-time less than or equal to the mean (50% probability). For example, a 'mean' solution with a cycle time of 39237 minutes would be 9.32 standard deviations below the mean of the problem solution space, and the probability of finding such a solution (or better) using an unbiased solver is less than 1 in $10^{19}$. Likewise, assuming that the optimizing combinatorial solver does not take too long to produce an individual schedule, repeatedly applying it to a randomized form of the benchmark scenario could reasonably be expected to yield a schedule with a cycle time that is about 3 standard deviations (or more) below the mean, with a cycle time of about 37534 minutes (a decrease from the mean of the problem solution space of about 25.2%). For example, the applicants were able to produce a solution having a cycle time of 37310 minutes in one instance of running 1000 trials of the referenced solver. Consequently, a prospective customer, given the statistical parameters of the problem solution space and the statistical parameters developed by a combinatorial solver working on the benchmark problem, can asses (1) the degree to which the combinatorial solver improves upon solutions that may developed using simple chance and, more significantly, (2) the likely computational effort required to obtain a solution of a particular quality in view of the capabilities of the combinatorial solver. It is thus possible to determine whether any particular solution is representative or atypical of the combinatorial solver's characteristic performance, as well as whether practical amounts of additional computational effort are likely to improve upon a particular solution.

Example 2

Figure 10:
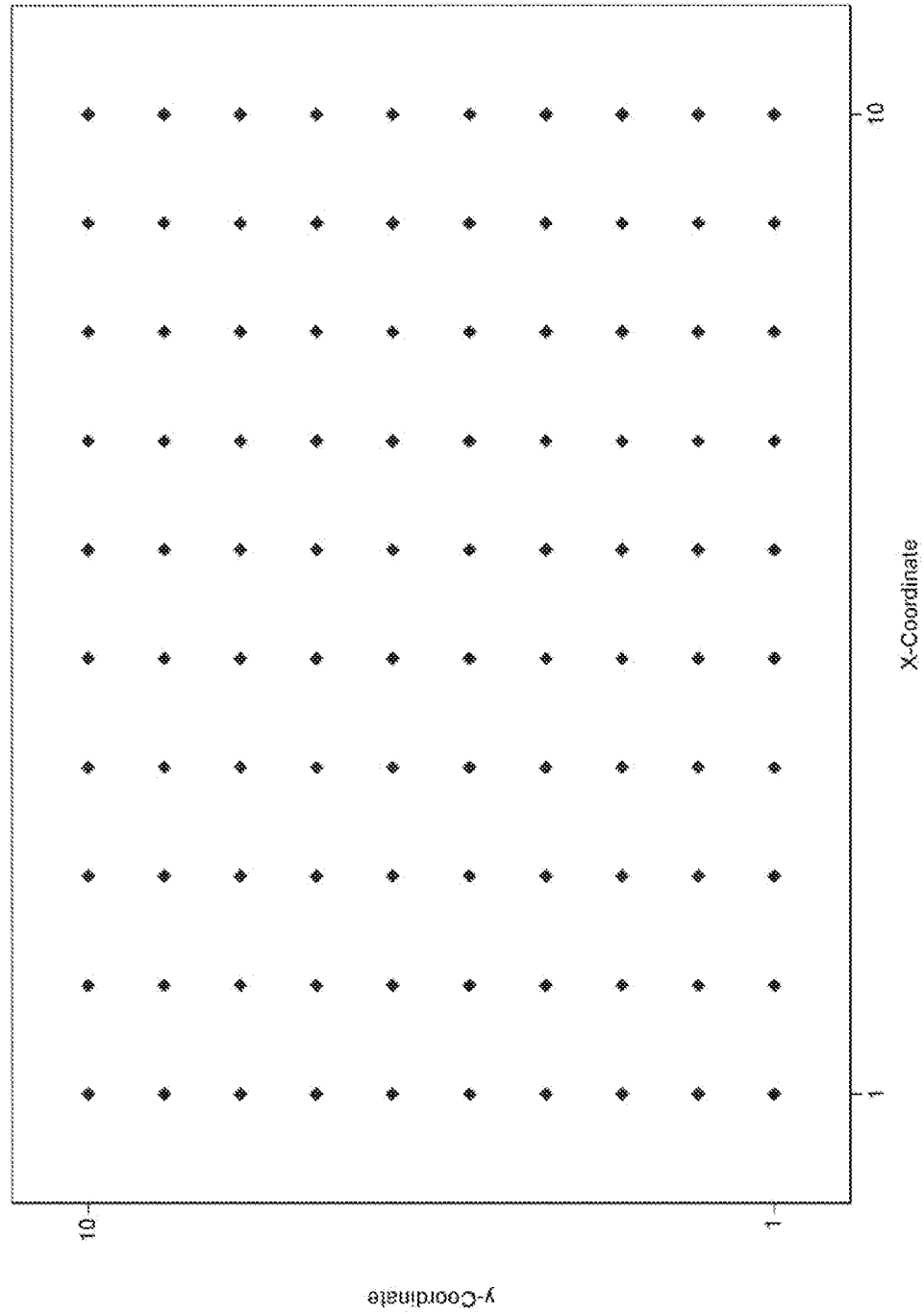
FIG. 10 is an illustration of an exemplary Traveling Salesman Problem.
Figure 11:
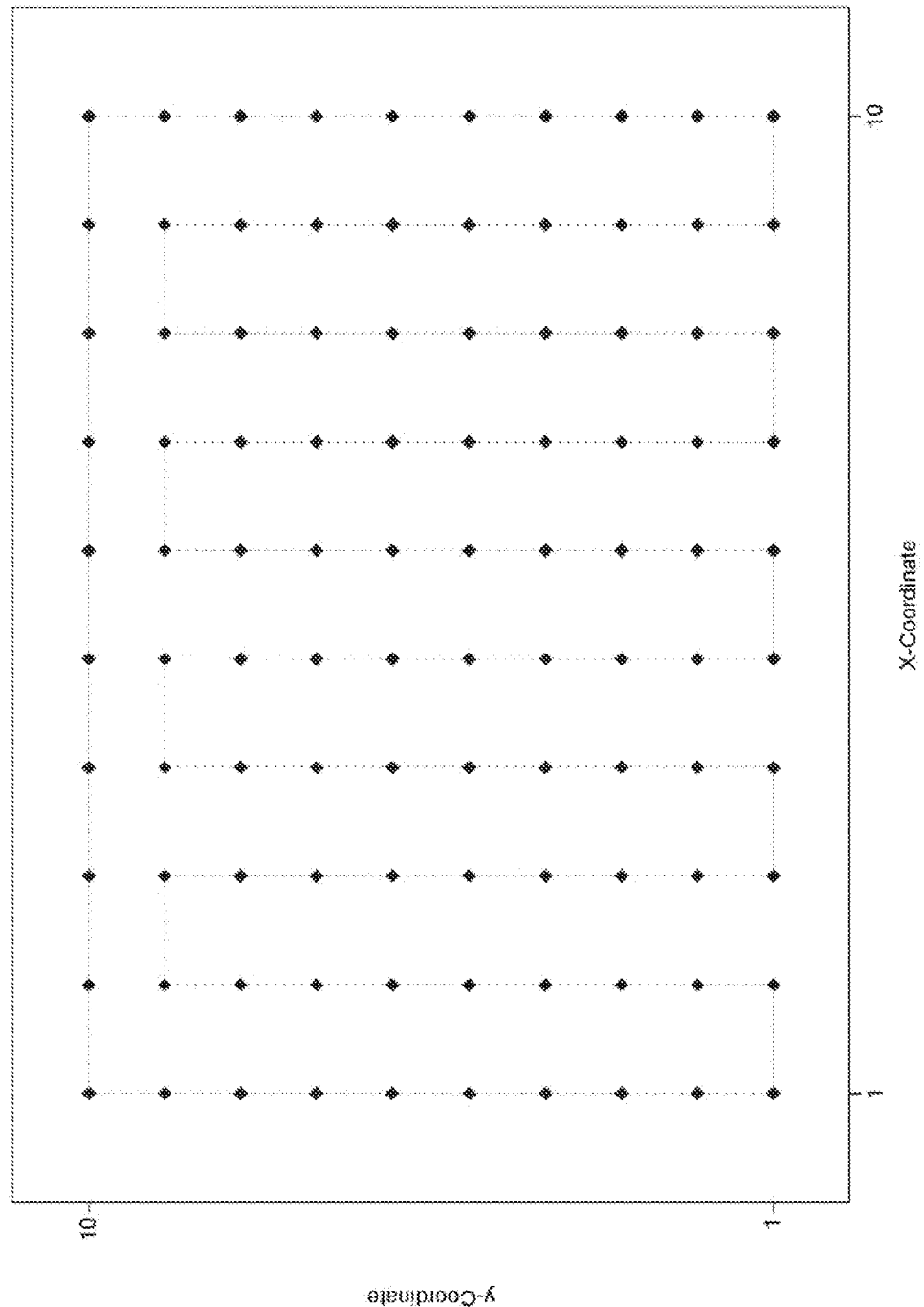
FIG. 11 is an illustration of an optimal solution to the exemplary Traveling Salesman Problem shown in FIG. 10.

To further illustrate the method, a specially constructed TSP having 100 cities arranged in a rectangular grid with spacing of 1 unit is shown in FIG. 10. The cities are arranged in that grid to permit easy determination and visualization of an optimal solution, without need to rely upon an optimization algorithm. A diagram of one (among many possible) optimal tours is shown in FIG. 11.

Five combinatorial solvers were compared: an unbiased combinatorial solver (solutions plotted and labeled 10), a combinatorial solver implementing a method known as 2-Opt (solutions plotted and labeled 20), a combinatorial solver implementing a method known as 3-Opt (solutions plotted and labeled 30), a combinatorial solver implementing a method known as Exchange-2 (or X2, solutions plotted and labeled 40), and a combinatorial solver implementing a combination of the Exchange-2 and 2-Opt methods (solutions plotted and labeled 50). The unbiased combinatorial solver simply generates a random sequence for the 100 cities and evaluates the round trip distance. The combinatorial solver implementing Exchange-2 begins with a random sequence and then exhaustively considers whether the round trip distance might be improved by exchanging the position of two cities within the sequence, repeating over and over again until no further improvements can be made. The combinatorial solver implementing 2-Opt begins with a random sequence and then exhaustively considers whether the round trip distance might be improved by dividing the sequence into 2 sub-sequences and then inverting the order of one sub-sequence, repeating over and over again until no further improvements can be made. The combinatorial solver implementing 3-Opt begins with a random sequence and then exhaustively considers whether the round trip distance might be improved by dividing the sequence into 3 sub-sequences and inverting the order of one or two of those sub-sequences, repeating over and over again until no further improvements can be made. The combinatorial solver implementing Exchange-2/2-Opt first implements Exchange-2, as described above, and then implements 2-Opt, as described above, and evaluates the results.

Figure 12:
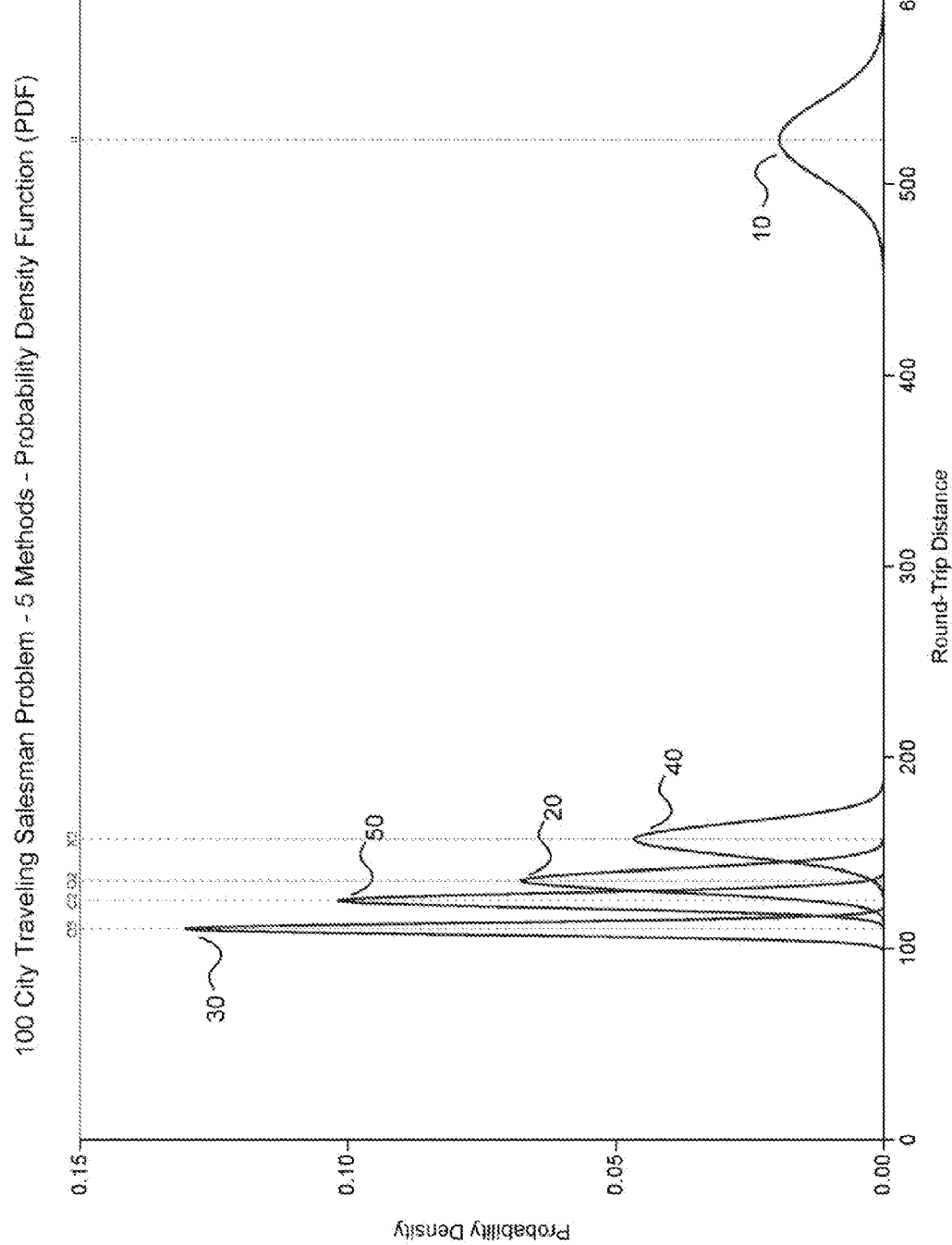
FIG. 12 is a graph of the empirical probability density function of solutions to the exemplary Traveling Salesman Problem shown in FIG. 10 for 5 combinatorial solvers in terms of probability density versus round trip distance (indicated, respectively, with reference numerals 10, 20, 30, 40, and 50).

Benchmark data was collected using the aspects of the method described above for 100 trials per combinatorial solver. The results are summarized in Table 1A and in FIG. 12. In FIG. 10, the means of the unbiased, Exchange-2, 2-Opt, and 3-Opt solution populations are labeled to as U, X2, O2, and O3 respectively. The mean of the combination Exchange-2/2-Opt solution population is labeled as C2. With this data, it is possible to both compare the combinatorial solvers and make certain predictions. For example, it is possible to estimate the best solution likely to be found after conducting additional trials using each combinatorial solver. Table 1B list the estimated minimum round trip distance to be found after conducting 1000 trials, as well as the actual minimum found in a particular instance of 1000 trials.

TABLE 1A

Benchmark Data for 100 trials based upon the TSP of FIG. 10

| Method | Unbiased | X2 | 2-Opt | X2 + 2-Opt | 3-Opt |
|---|---|---|---|---|---|
| Elapsed Time (mS) | 15 | 140 | 63 | 140 | 6555 |
| mS per Solution | 0.15 | 1.40 | 0.63 | 1.40 | 65.55 |
| Number of Trials | 100 | 100 | 100 | 100 | 100 |
| Maximum | 577.60 | 178.69 | 148.82 | 133.39 | 117.44 |
| Mean | 523.29 | 156.92 | 135.54 | 125.17 | 110.32 |
| Minimum | 474.01 | 136.37 | 119.33 | 113.86 | 101.66 |
| Standard Deviation | 20.48 | 8.55 | 5.89 | 3.92 | 3.06 |

TABLE 1B

Estimates and Actual Benchmark Data for 1000 trials based upon the TSP of FIG. 10

| Method | Unbiased | X2 | 2-Opt | X2 + 2-Opt | 3-Opt |
|---|---|---|---|---|---|
| Estimated Minimum | 461.85 | 131.27 | 117.88 | 113.39 | 101.15 |
| Actual Minimum | 462.80 | 130.74 | 116.45 | 113.10 | 101.66 |

The reader should appreciate that the combinatorial solvers implementing the combination Exchange-2/2-Opt solution approach and the 3-Opt solution approach found solutions with values of ~113 and ~101, respectively, after only 100 trials. This illustrates an important fact: statistical predictions can never be exact. Sometimes a target solution with a value less than a predetermined threshold will be found in fewer trials than predicted by an estimate, and sometimes achieving a target solution with a value less than a predetermined threshold will require more trials than predicted by an estimate. While it is not surprising that good solutions can found after conducting only 100 trials, it remains true that the best solutions likely to be found after conducting a predetermined number of trials will have values which approximate, or are "about," the estimated minimum. Similarly, the estimated number of trials to be conducted to find a solution that is superior to a predetermined threshold of the criterion of solution quality, once conducted, will likely result in a solution having a minimum value that approximates, or is "about," the predetermined threshold value—the actual best solution value may be superior or inferior to the predetermined threshold value selected for the statistical estimate.

The estimates extrapolated from the parameters reported in Table 1A show good correlation with the actual minimums found after conducting 1000 trials. At 100 trials, the benchmarks sample approximately 2 standard deviations of a solver solution space, while at 1000 trials the benchmarks sample approximately 3 standard deviations of that same solution space. However, there are limits to the range of extrapolation. All problems of interest have a finite range of solutions, with the best possible solution or solutions being known as an optimal solution. All solution approaches for solving a given problem will also produce a finite range of solutions within that problem range. In some cases a solution approach may generate solutions that draw near an optimal solution, and may be expected to find an optimal solution (for small problems) within a reasonable period of time. In other cases a solution approach will tend to generate solutions that are farther from an optimal solution, and there will be practical limits on the range of solutions that can generated within a reasonable period of time. In the applicants' experience, the parameters developed in benchmarks based upon 100 trials (2 standard deviations) can often be used to extrapolate estimates of values to be found when conducting to up to 1000 trials (3 standard deviations), but extrapolation beyond 3 standard deviations becomes less reliable as a matter of degree.

Still other predictions can be made using parameters like those reported in Table 1A. For example, consider the following questions: (1) Would repeated use of the combinatorial solver implementing Exchange-2 be likely to find a solution with a value superior to the value of the average solution generated by the combinatorial solver implementing 2-Opt? (less than 125) (2) Would repeated use of the combinatorial solver implementing 2-Opt, or the combinatorial solver implementing Exchange-2/2-Opt, be likely to find a solution with a value superior to the value of the average solution generated by the combinatorial solver implementing 3-Opt? (less than 110). The estimated and actual number of trials required in each case is shown in Table 2.

TABLE 2

Benchmark Data for 100 trials based upon the TSP of FIG. 10

| Method | Unbiased | X2 | 2-Opt | X2 + 2-Opt | 3-Opt |
|---|---|---|---|---|---|
| Threshold | N/A | 125.17 | 110.32 | 110.13 | N/A |
| Estimated Trials | N/A | 9808 | 109044 | 15643 | N/A |
| Actual Minimum | N/A | 124.98 | 111.01 | 109.95 | N/A |
| Actual Trials | N/A | 8998 | 206862 | 15572 | N/A |

The results have good correlation for the Exchange-2 and Exchange-2/2-Opt solution approaches, but are less satisfactory for the 2-Opt solution approach. This suggests that the 2-Opt algorithm has a range of solutions that has intrinsic bounds. The 2-Opt and 3-Opt solution approaches operate by correcting errors in a given sequences (by inverting subsequences to produce better sequences). After exhaustive consideration of all possible corrections, the 2-Opt solution approach will leave certain errors uncorrected that would be corrected by a 3-Opt solution approach. Also, in the case of the 2-Opt solution approach, the target solution value of 110 is more than 4 standard deviations below the solution mean (4.24 standard deviations from 135.54), and an extrapolation from parameters gathered at 2 standard deviations below the mean is simply far less reliable. Nevertheless, the extrapolation from the determined parameters correctly predicted that many more trials would be needed for the combinatorial solver implementing 2-Opt than the combinatorial solvers implementing X2 and Exchange-2/2-Opt.

The reader should appreciate that the ability to predict the number of trials likely needed to find a target solution with a value less than a predetermined threshold may be combined with measurements of the speed of a combinatorial solver and solution approach to estimate the time required to find that target solution. Although the examples shown in Table 1A do not explicitly illustrate this point, there can be cases where a faster implementation generates solutions with a larger mean, but a wider standard deviation, such that it may find a target solution in repeated trials in less time than a slower algorithm generating solutions with a smaller mean and a narrower standard deviation. The method disclosed herein enables a wide range of possible analyses such as these.

The various embodiments described above are intended to be illustrative in nature and are not intended to limit the scope of the invention. Any limitations to the invention will appear in the claims as allowed.

What is claimed is:

1. A method of benchmarking the problem solution space of a trial scenario for a combinatorial solver, the trial scenario including predetermined trial scenario data, and the method including the steps of:
   a. obtaining a random sequence;
   b. reordering the predetermined trial scenario data into a randomized input form according to the random sequence;
   c. inputting the randomized input form into an unbiased combinatorial solver;
   d. solving the randomized input form with the unbiased combinatorial solver to produce a solution;
   e. evaluating the solution to measure the value of a criterion of solution quality;
   f. recording the measured value of the criterion of solution quality in a data storage structure;
   g. repeating the obtaining, reordering, inputting, solving, evaluating, and recording steps for a predetermined number of trials representing a subset of the problem solution space having statistical power; and
   h. analyzing a statistical distribution of the measured values in the data storage structure and determining at least one parameter of a statistical distribution function.

2. The method of claim 1, wherein the statistical distribution function is a Gaussian distribution.

3. The method of claim 2, wherein the at least one parameter includes the mean $\mu$ and standard deviation $\sigma$ of the Gaussian distribution.

4. The method of claim 1, wherein the measured values in the data storage structure are evaluated to verify that a problem solution space of the trial scenario may be approximately described by a selected statistical distribution function.

5. The method of claim 1, wherein the measured values in the data storage structure are plotted as a histogram for comparison with the selected statistical distribution function.

6. The method of claim 1, wherein the measured values in the data storage structure are subjected to a mathematical analysis to check whether there is a significant deviation from a selected statistical distribution function.

7. The method of claim 6, wherein the measured values in the data storage structure are subjected to an Anderson-Darling test versus the selected statistical distribution function.

8. The method of claim 7 wherein the selected statistical distribution function is the Gaussian cumulative probability distribution function.

9. The method of claim 1, further comprising the step of communicating at least the at least one parameter of the statistical distribution function to a third party.

10. A method of benchmarking the characteristic performance of a combinatorial solver operating upon predetermined trial scenario data, the method including the steps of:
   a. obtaining a random sequence;
   b. reordering the predetermined trial scenario data into a randomized input form according to the random sequence;
   c. inputting the randomized input form into the combinatorial solver;
   d. solving the randomized input form with the combinatorial solver to produce a solution;
   e. evaluating the solution to measure the value of a criterion of solution quality;
   f. recording the measured value of the criterion of solution quality in a data storage structure;
   g. repeating the obtaining, reordering, inputting, solving, evaluating, and recording steps for a predetermined number of trials representing a subset of the problem solution space having statistical power; and
   h. analyzing a statistical distribution of the measured values in the table and determining at least one parameter of a statistical distribution function.

11. The method of claim 10, wherein the statistical distribution function is a Gaussian distribution.

12. The method of claim 11, wherein the at least one parameter includes the mean $\mu$ and standard deviation $\sigma$ of the Gaussian distribution.

13. The method of claim 10, wherein the measured values in the data storage structure are evaluated to verify that a problem solution space of the trial scenario may be approximately described by a selected statistical distribution function.

14. The method of claim 10, wherein the measured values in the data storage structure are plotted as a histogram for comparison with the selected statistical distribution function.

15. The method of claim 10 wherein the measured values in the data storage structure are subjected to a mathematical analysis to check whether there is a significant deviation from a selected statistical distribution function.

16. The method of claim 15, wherein the measured values in the data storage structure are subjected to an Anderson-Darling test versus the selected statistical distribution function.

17. The method of claim 16 wherein the selected statistical distribution function is the Gaussian cumulative probability distribution function.

18. The method of claim 10, further comprising the step of communicating at least the at least one parameter of a statistical distribution function to a third party.

19. The method of claim 10, further comprising the step of applying the at least one parameter of the statistical distribution function to estimate the minimum value of the criterion of solution quality to be found by solving the randomized input form with the combinatorial solver for a second predetermined number of trials.

20. The method of claim 10, further comprising the step of applying the at least one parameter of the statistical distribution function to estimate a second predetermined number of trials over which to solve the randomized input form with the combinatorial solver in order to find a solution having a minimum value of the criterion of solution quality of about a predetermined threshold value.

* * * * *